(12) United States Patent
Sakai et al.

(10) Patent No.: US 7,023,355 B2
(45) Date of Patent: Apr. 4, 2006

(54) OCCUPANT DETERMINATION DEVICE

(75) Inventors: Morio Sakai, Toyota (JP); Masaki Mori, Kariya (JP); Kazunori Sakamoto, Chiryu (JP); Minoru Izawa, Okazaki (JP); Yasunori Hasegawa, Kasugai (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 162 days.

(21) Appl. No.: 10/724,048

(22) Filed: Dec. 1, 2003

(65) Prior Publication Data

US 2004/0173398 A1     Sep. 9, 2004

(30) Foreign Application Priority Data

Nov. 29, 2002  (JP) .............................. 2002-348377

(51) Int. Cl.
*G08B 21/00*     (2006.01)

(52) U.S. Cl. ......................................... 340/667; 701/45

(58) Field of Classification Search ................ 340/667; 180/273; 280/735; 701/45

See application file for complete search history.

(56) References Cited

U.S. PATENT DOCUMENTS

| | | | |
|---|---|---|---|
| 5,474,327 A * | 12/1995 | Schousek | 280/735 |
| 6,246,936 B1 * | 6/2001 | Murphy et al. | 701/45 |
| 6,345,839 B1 * | 2/2002 | Kuboki et al. | 280/735 |
| 6,356,194 B1 * | 3/2002 | Fukui et al. | 340/561 |
| 6,542,802 B1 * | 4/2003 | Gray et al. | 701/45 |
| 6,609,054 B1 * | 8/2003 | Wallace | 701/45 |
| 6,636,792 B1 * | 10/2003 | Lichtinger et al. | 701/45 |
| 6,845,339 B1 * | 1/2005 | Winkler et al. | 702/173 |
| 6,871,159 B1 * | 3/2005 | Hattori et al. | 702/173 |
| 6,876,299 B1 * | 4/2005 | Sakai et al. | 340/436 |

FOREIGN PATENT DOCUMENTS

| | | |
|---|---|---|
| JP | 9-207638 A | 8/1997 |
| JP | 11-198705 A | 7/1999 |
| JP | 2000-127890 A | 5/2000 |

* cited by examiner

*Primary Examiner*—Jeffery Hofsass
*Assistant Examiner*—Eric Blount
(74) *Attorney, Agent, or Firm*—Buchanan Ingersoll PC

(57) ABSTRACT

An occupant determination device for a vehicle seat includes a load sensor provided at a seat body, a controller for calculating a detection load value based on a load value output from the load sensor and for determining whether an occupant seated on the vehicle seat is adult or a child, wherein a hysteresis is provided for changing the occupant determination from either a child or an adult to an adult or a child.

7 Claims, 4 Drawing Sheets

OCCUPANT DETERMINATION DEVICE

This application is based on and claims priority under 35 U.S.C. § 119 with respect to Japanese Application No. 2002-348377 filed on Nov. 29, 2002, the entire contents of which are incorporated herein by reference.

FIELD OF THE INVENTION

This invention generally relates to an occupant determination device for a vehicle seat. More particularly, this invention pertains to an occupant determination device for a vehicle seat operated based on a load value output from a load sensor that is provided on the vehicle seat.

BACKGROUND OF THE INVENTION

In case where an air bag is provided for protecting an occupant sitting on a vehicle seat, an occupant determination device is provided at the vehicle seat for determining whether an occupant is seated or not on the corresponding seat, the occupant is an adult or a child, or the like. Japanese Patent Laid-open Publication No. 09-207638 discloses a known occupant determination device. The disclosed device includes a plurality of load sensors provided at a plurality of fixing positions respectively of a seat body facing a vehicle floor, and a controller for calculating a detection load value based on load values output from the plurality of load sensors and for determining whether or not an occupant is seated on the vehicle seat based on the calculated detection load value. More specifically, the controller calculates a detection load value by summing up the load values output from the plurality of load sensors using an adder, compares this detection load value with a load value set in advance (threshold value for determination) using a determination processing circuit, and determines whether or not an occupant is seated on the vehicle seat by comparing the detection load value and the threshold value for determination.

When the occupant determination to determine a child or an adult is made based on the difference between a detection load value and a determination threshold value, if the detection load value corresponding to a weight of an adult is close to the determination threshold value, the changing of the determination (from a child to an adult or vice versa) may be frequently made due to the vibration of the vehicle or the change of the occupant posture. In order to prevent such frequent changes of determination, a delay time is provided at changing the determination. However, since the vibration of the vehicle or the change of the posture of the occupant may occur not periodically or may continue for not constant time, the delay time setting is not a sufficient solution for the problems. In another known art, Japanese patent Application published as 11-198705, a proposal has been made to use an output pattern of an antenna embedded in the seat back to improve the accuracy of the occupant determination. In further known art, Japanese Patent Application published as 2000-127890, the device disclosed in this art detects a seatbelt tension and corrects the determination threshold value based on the tension value to improve the accuracy of the occupant determination. However, in such known art method, it is necessary to provide a detecting element for exclusive use which may lead to cost increase.

SUMMARY OF THE INVENTION

According to an aspect of the present invention, an occupant determination device for a vehicle seat includes a load sensor provided at a seat body, a controller for calculating a detection load value based on a load value output from the load sensor. The controller determines whether an occupant seated on the vehicle seat is an adult or a child. The device includes hysteresis provided for changing the occupant determination from either a child or an adult to an adult or a child.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
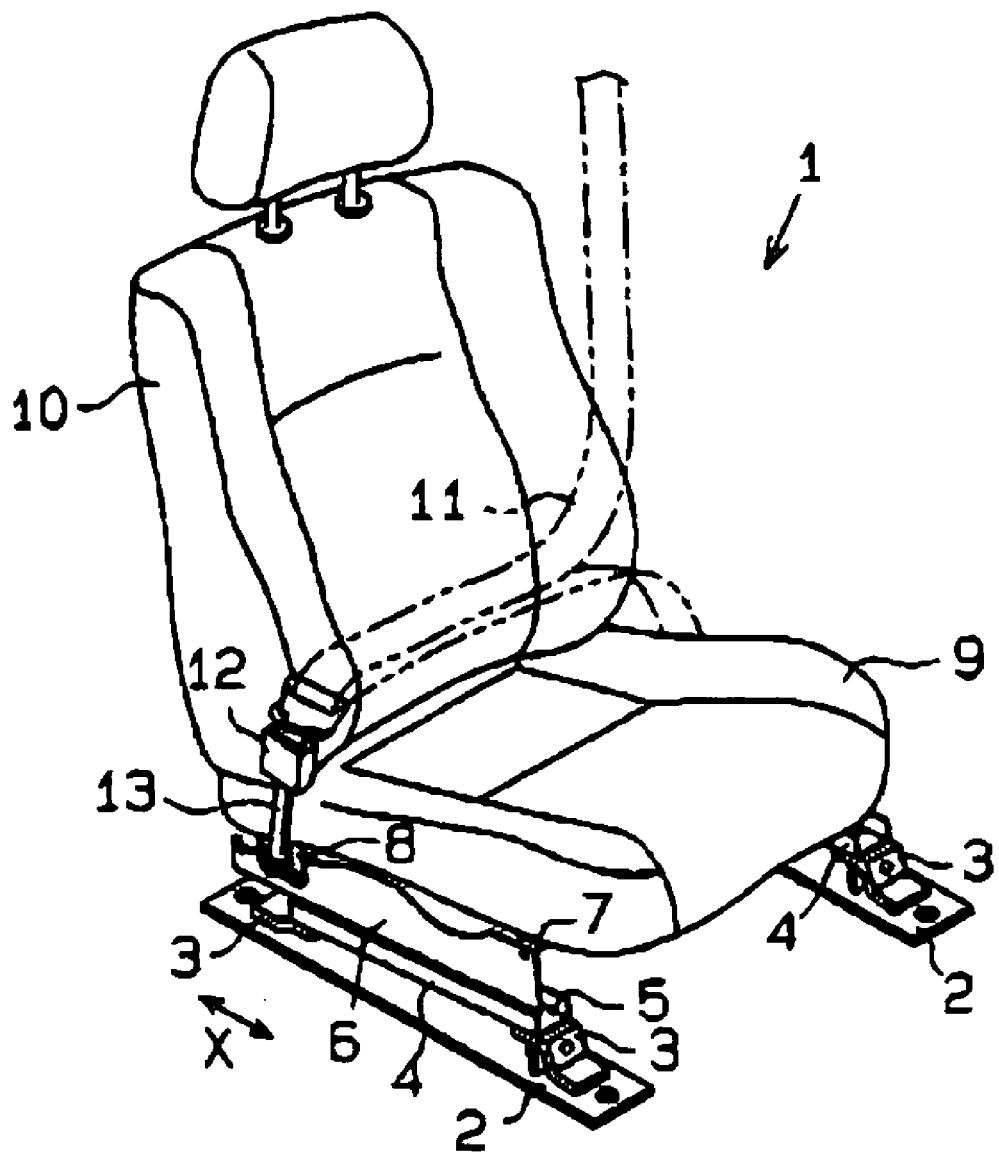
FIG. 1 is a perspective view of a vehicle seat according to an embodiment of the present invention.

An embodiment of the present invention is explained referring to FIGS. 1 to 5. FIG. 1 is a perspective view of a seat body 1 of a vehicle seat. The seat body 1 is provided on a passenger seat side of a vehicle. A pair of supporting frames 2 provided on right and left sides respectively in FIG. 1 is fixed on a vehicle floor (not shown) in a longitudinal direction of the vehicle (in arrow X direction in FIG. 1).

Brackets 3 formed by two pairs of brackets, each provided on front and rear sides in FIG. 1 of the seat body 1 are fixed on an upper face of the respective supporting frames 2. A pair of lower rails 4 provided on right and left sides in FIG. 1 is fixed to the respective pairs of brackets 3 along the supporting frames 2. Each lower rail 4 obtains a U-shape in cross section, whose upper portion opens and extends in the longitudinal direction of the vehicle to thereby form a sliding groove 5.

Figure 2:
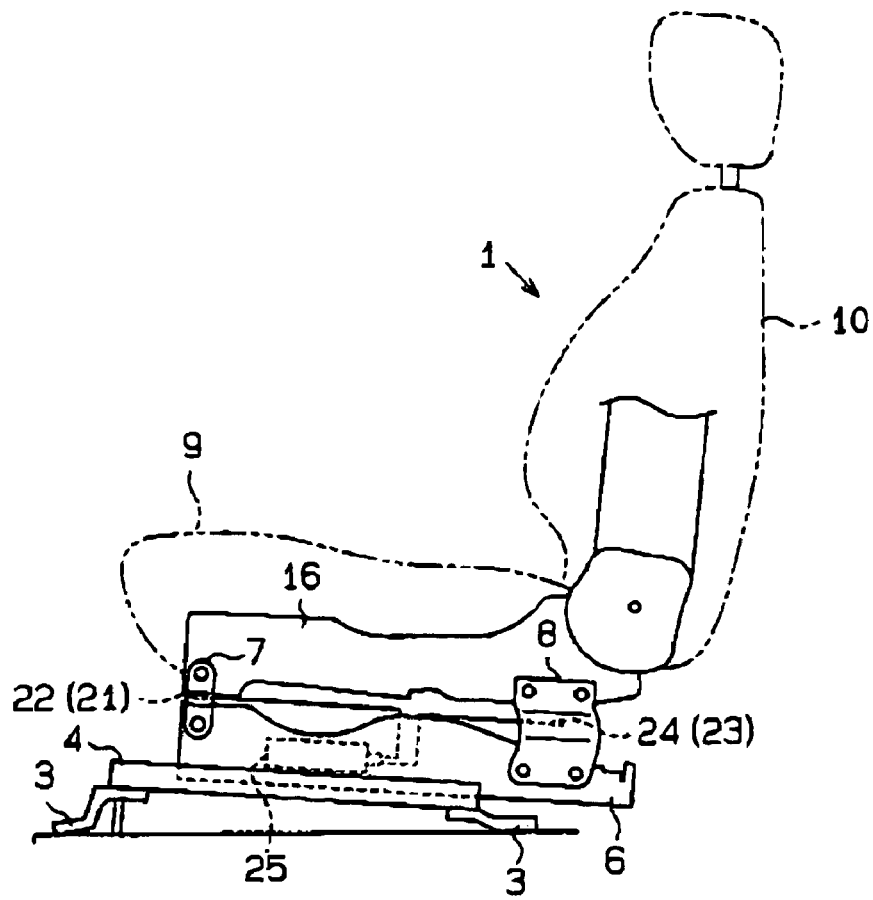
FIG. 2 is a side view of the vehicle seat according to the embodiment of the present invention.

A pair of upper rails 6 provided on right and left sides in FIG. 1 is slidable in the sliding grooves 5 formed at the respective lower rails 4. As shown in FIG. 2, each upper rail 6 is connected to each lower arm 16 that supports a seat cushion 9 and a seat back 10 of the seat body 1 with keeping a predetermined distance between the lower arm 16 and the upper rail 6 via one of a pair of front side sensor brackets 7 provided on right and left front sides in FIG. 1 and one of a pair of rear side sensor brackets 8 provided on right and left rear sides in FIG. 1.

Figure 3A:
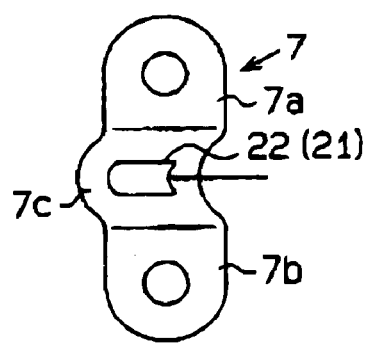
FIG. 3a is a front view of a sensor bracket provided on a front side of the vehicle seat.

As shown in FIG. 3a, each front side sensor bracket 7 includes an upper end portion 7a at an upper end side, a lower end portion 7b at a lower end side, and a bending portion 7c formed by bending a portion between the upper fastener portion 7a and the lower fastener portion 7b. The front side sensor bracket 7 is connected to the lower arm 16 via the upper end portion 7a and the front portion of the upper rail 6 via the lower end portion 7b. Then, a right front load sensor 21 and a left front load sensor 22 are attached to the respective bending portions 7c of the front side sensor brackets 7 on right and left side of the seat cushion 9. The right front load sensor 21 and the left front load sensor 22 each includes an element for detecting deformation such as a strain gauge and electrically detects a bending degree of the bending portion 7c bending in response to the load applied to the seat cushion 9.

Figure 3B:
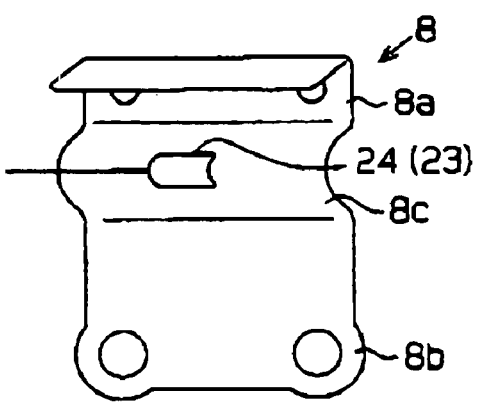
FIG. 3b is a front view oh a sensor bracket provided on a rear side of the vehicle seat.

As shown in FIG. 3b, each rear side sensor bracket 8 includes an upper end portion 8a at an upper end side, a lower end portion 8b at a lower end side, and a bending portion 8c formed by bending a portion between the upper fastener portion 8a and the lower end portion 8b. The rear side sensor bracket 8 is connected to the lower arm 16 via the upper end portion 8a and the rear portion of the upper rail 6 via the lower end portion 8b. Then, a right rear load sensor 23 and a left rear load sensor 24 are attached to the respective bending portions 8c of the rear side sensor brackets 8 on right and left side of the seat cushion 9. In the same manner as the right front and left front load sensors 21 and 22, the right rear load sensor 28 and the left rear load sensor 24 each includes an element for detecting deformation such as a strain gauge and electrically detects a bending degree of the bending portion 8c bending in response to the load applied to the seat cushion 9.

Figure 4:
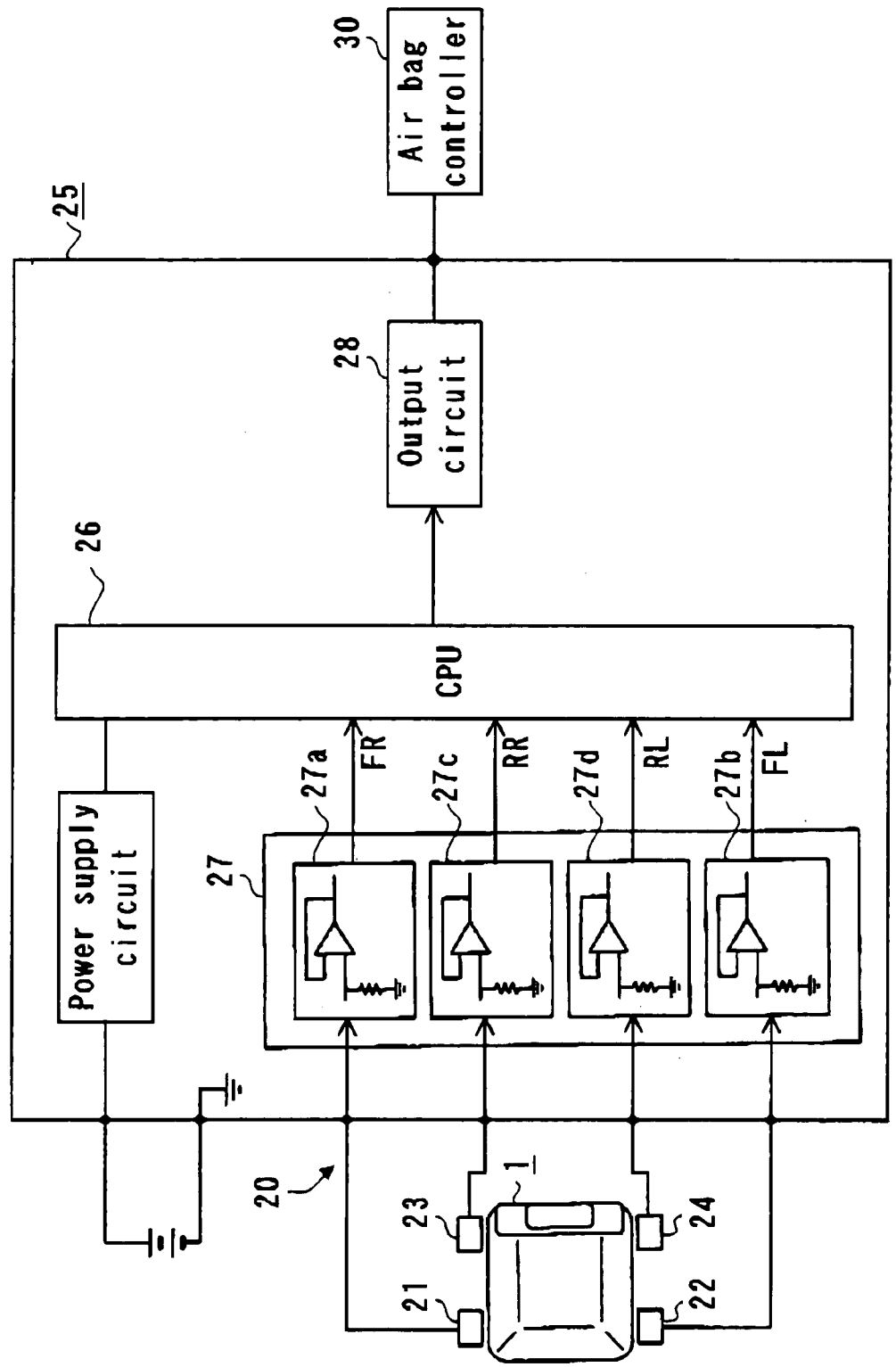
FIG. 4 is a block diagram of an electrical structure of the embodiment of the present invention.
Figure 5:
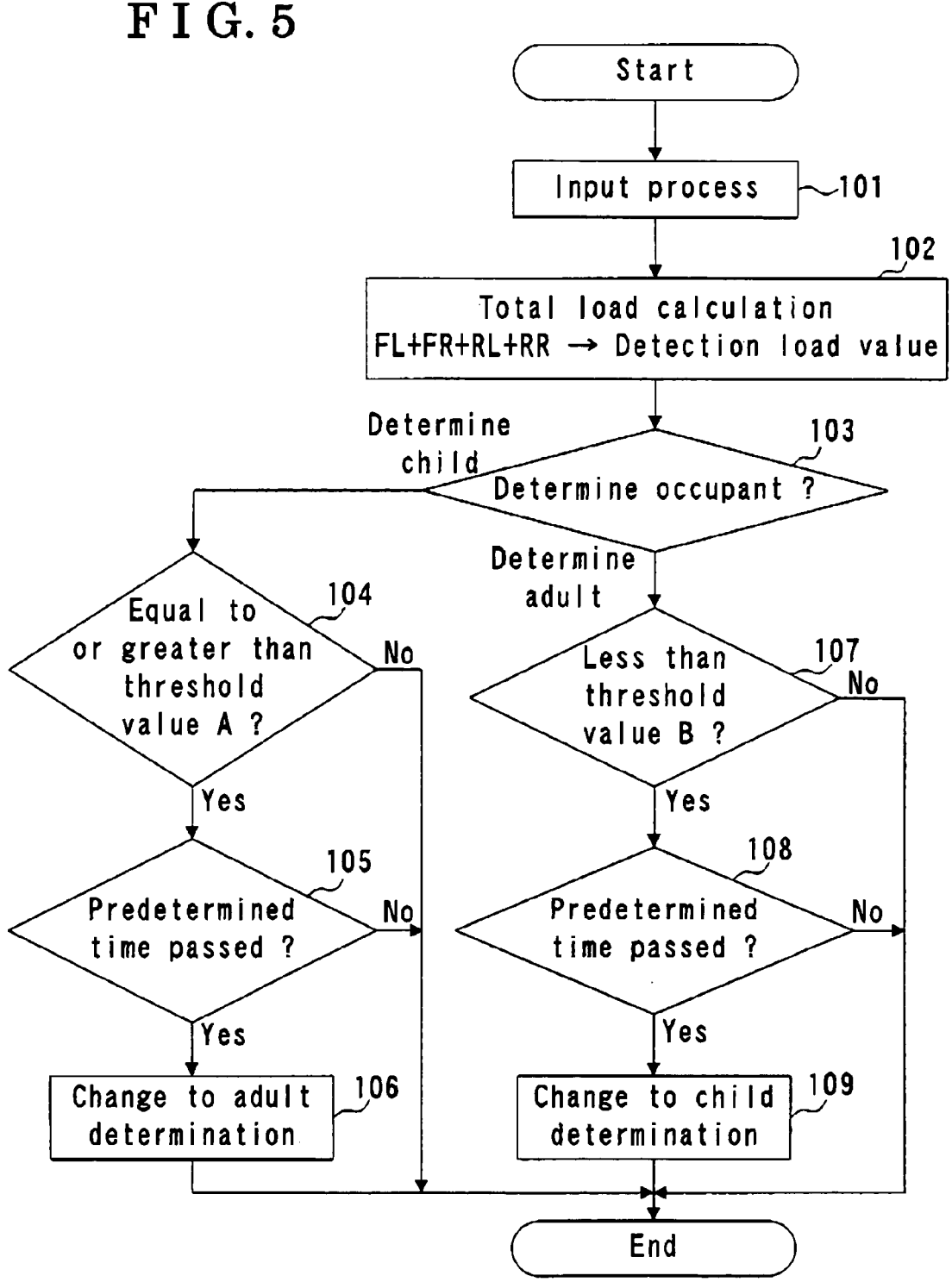
FIG. 5 is a flowchart of an occupant determination operation according to the embodiment of the present invention.

FIG. 4 is a block diagram showing an electrical structure of an occupant determination device 20 employed in the vehicle seat. The occupant determination device 20 according to the present embodiment includes the aforementioned load sensors 21 to 24, and a controller 25.

The controller 25 includes a central processing unit (hereinafter referred to as CPU) 26, a sensor signal input circuit 27, an output circuit 28. The sensor signal input circuit 27 includes active filters 27a, 27b, 27c, and 27d that are associated with the right front load sensor 21, the left front load sensor 22, the right rear load sensor 23 and the left rear load sensor 24, respectively. The load signal from the load sensors 21 to 24 is input to the CPU 26 via the active filters 27a to 27d. Each of the active filters 27a to 27d is a known low-pass filter, which is configured, for example, by a combination of a passive element, which includes a capacitor and a resistor, and an active element, which includes an amplifier. The active filters 27a to 27d only pass low frequency signals and eliminate other signals among those generated by the load sensors 21 to 24.

In the CPU 26, output load values FR and FL are calculated based on the respective load signals from the right front load sensor 21 and the left front load sensor 22 that have passed through the active filters 27a and 27b respectively. In addition, output load values RR and RL are calculated based on the respective load signals from the right rear load sensor 23 and the left rear load sensor 24 that have passed through the active filters 27c and 27d respectively. Then, a detection load value Ws is calculated by summing up the output load values FR, FL, RR and RL.

The CPU 26 executes various calculations based on the pre-stored control programs and initial data and output the calculation result, which is the occupant determination result to the output circuit 28. The output result is then output to for example, an airbag controller 30 for controlling the airbag device A process of the occupant determination according to the present embodiment is explained based on a flowchart in FIG. 5. This process is repeatedly performed in interrupts at predetermined time intervals.

When a routine of the flowchart is entered, the CPU 26 performs an input operation in Step 101. Specifically, the CPU 26 reads the load signal from the load sensors 21 to 24, which has been filtered in the sensor signal input circuit 27. Next, at Step 102, the CPU 26 calculates the detection load value Ws by summing up the output load values FR, FL, RR, and RL, which are calculated based on the respective load signals from the load sensors 21, 22, 23 and 24, and once stores that calculated detection load value Ws in a memory. Then the CPU 26 proceeds to Step 103.

In Step 103, the CPU 26 determines whether or not the occupant is adult or child. Specifically, the CPU 26 determines the current occupant condition by reading in the occupant determination result, which has been set and memorized in the memory based on the previous routine operation. If the current occupant determination condition is determined to be in child determination condition, the CPU 26 proceeds to Step 104 for determination of the detection load value Ws to be greater than or equal to a predetermined first determination threshold value A. The first determination threshold value A is set to an appropriate value for determining the occupant to be an adult within the range of posture to be surely determined.

When it is determined that the detection load value Ws equal to or more than the first determination threshold value A at Step 104, the CPU 26 proceeds to Step 105 and determines whether the detection load value Ws continues to keep such value (equal to or more than the value A) for a predetermined time T1 or not. The predetermined time T1 is the time for delay process to prevent determination condition change due to temporally increase of the detection load value Ws. If the detection load value Ws continues to keep such value (equal to or more than the value A) for the predetermined time T1, the CPU proceeds to Step 106 to change the determination from child to adult occupant. In more detail, the occupant determination is changed from child determination to adult determination and is memorized in the memory and renewed. The CPU then temporarily stops its processing.

When the detection load value We is less than the first determination threshold value A at Step 104 or when the detection load value Ws does not continue to keep the value (equal to or more than the value A) for the predetermined time T1 at Step 105, the CPU stops its processing. Accordingly, the occupant determination is kept to the condition determined at the previous routine (child determination).

On the other hand, when the current occupant condition is determined to be an adult condition at Step 103, the CPU proceeds to Step 107 to determine whether the detection load value Ws is less than a second determination threshold value B or not. The second determination threshold value B is smaller than the first determination threshold value B (B<A) and is set to be a value which is suitable for determining the occupant to be an adult within the posture range of frequently made by an adult occupant.

In Step 107, when the detection load value Ws is determined to be less than the second determination threshold value, the CPU 26 proceeds to Step 108 to determine whether the detection load value Ws is kept to be less than the second determination threshold value B for a second predetermined time T2. The second predetermined time T2 is the time for delay process to prevent determination condition change due to temporally decrease of the detection load value Ws. When the detection load value Ws is kept to be less than the second determination threshold value B for the second predetermined time T2, the CPU proceeds to Step 109 to change the occupant determination from "adult" to "child". In more detail, the occupant determination is changed from adult determination to child determination and is, memorized in the memory and renewed. The CPU then temporarily stops its processing.

When the detection load value Ws is equal to or more than the second determination threshold value B at Step 107, or when the detection load value Ws does not continue to keep the value (less than the value B) for the second predetermined time T2 at Step 108, the CPU stops its processing. Accordingly, the occupant determination is kept to the condition determined at the previous routine (adult determination).

According to the present embodiment as mentioned above, a hysteresis is provided for changing the occupant determination (changing the adult or child occupant determination) by setting the two different determination threshold values A and B (A>B). This will enable the prevention of erroneous determination, which may occur in the case when the detection load value decreases during adult occupant determination. In other words, during the adult occupant determination, even when the detection load value Ws decreases, the adult occupant determination is not changed to child occupant determination unless the detection load value Ws becomes less than the second determination threshold value B which is smaller than the first determination threshold value A. On the other hand, during child occupant determination, even when the detection load value Ws increases, the child occupant determination is not changed to adult occupant determination unless the detection load value Ws becomes more than or equal to the first determination threshold value A which is greater than the second determination threshold value B.

According to the present embodiment of the invention, the following features and advantages can be obtained.

(1) The occupant determination is changed from child to adult when the detection load value Ws is greater than the first determination threshold value A and is changed from the adult determination to child determination when the detection load value Ws becomes smaller than the second determination threshold value B (<A). In other words, a hysteresis is provided for changing the determination either from child or adult to adult or child. If the occupant determination is an adult, the determination will not be changed to a child unless the detection load Ws is within the second determination threshold value B which is set to the load value corresponding to the various postures frequently made by the adult occupant being seated. If the adult occupant is determined, the adult determination is kept without change when the adult occupant moves to reduce the detected load by changing the posture (changing seated position or the like) independently of the time. Further, even when the detection load value Ws corresponding to adult weight is close to the first determination threshold value A during adult determination, the determination change caused by the change of weight due to change of the posture of the occupant or the change of the weight due to the vehicle vibration can be prevented to improve the accuracy of occupant determination.

(2) The delay time is provided upon changing either from child or adult to adult or child determination to prevent an undesired determination change caused by a temporal load change.

The present embodiment is not limited to the above and can be modified. For example, the predetermined times T1 and T2 can be set to the same time period (T1=T2)

According to the present embodiment, the pair of load sensors 21 and 22 are provided on right and left-front sides of the seat body 1 and another pair of load sensors 23 and 24 are provided on right and left-rear sides of the seat body 1. However, the number and the arrangement of the load sensors may be modified. It is only required to arrange one or more load sensors at a predetermined position on the seat body 1 and to perform the occupant determination based on the detection load value from the load sensors.

Each shape of the sensor brackets 7 and 8 provided on front and rear sides of the seat body 1 may be modified as far as the sensor brackets 7 and 8 are surely bent in response to a seat weight (i.e. load applied to the seat).

The principles, preferred embodiment and mode of operation of the present invention have been described in the foregoing specification. However, the invention, which is intended to be protected, is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of th present invention as defined in the claims, be embraced thereby.

What is claimed is:

1. An occupant determination device for a vehicle seat comprising:
   a load sensor provided at a seat body;
   a controller for calculating a detection load value based on a load value output from the load sensor and determining whether an occupant seated on the vehicle seat is adult or a child based on the detected load value,
   wherein a hysteresis is provided for changing the occupant determination from either a child or an adult to an adult or a child.

2. An occupant determination device for a vehicle seat comprising:
   a load sensor provided at a seat body;
   a controller for calculating a detection load value based on a load value output from the load sensor, the controller changing the occupant determination from a child to an adult when the detection load value exceeds a first determination threshold value while the occupant determination being a child and changing the occupant determination from an adult to a child when the detection load value becomes smaller than a second determination threshold value which is smaller than the first determination threshold value while the occupant determination being an adult.

3. An occupant determination device according to claim 2, wherein the second determination threshold value is set based on the adult posture frequently made while seating on the vehicle seat.

4. An occupant determination device according to claim 2, wherein a delay time is set for changing from either a child or an adult occupant determination to an adult or a child occupant determination.

5. An occupant determination device according to claim 3, wherein a delay time is set for changing from either a child or an adult occupant determination to an adult or a child occupant determination.

6. An occupant determination device for a vehicle seat comprising:
   a plurality of load sensors provided at a seat body;
   a controller for calculating a detection load value based on the total load value outputs from the load sensors and for determining whether an occupant seated on the vehicle seat is adult or a child based on the detection load value, wherein a hysteresis is provided for changing the occupant determination from either a child or an adult to an adult or a child.

7. An occupant determination device according to claim 6, wherein, the controller changes the occupant determination from a child to an adult when the detection load value exceeds a first determination threshold value while the occupant determination being a child and changes the occupant determination from an adult to a child when the detection load value becomes smaller than a second determination threshold value which is smaller than the first determination threshold value while the occupant determination being an adult.

* * * * *